Sept. 23, 1958 R. C. GEBERT Re. 24,539

VELVET CARPET FABRIC

Original Filed June 23, 1953 2 Sheets-Sheet 1

Inventor:
Russell C. Gebert
by his Attorneys
Howson & Howson

VELVET CARPET FABRIC

Original Filed June 23, 1953 2 Sheets-Sheet 2

Inventor:
Russell C. Gebert
by his Attorneys
Howson & Howson

United States Patent Office

Re. 24,539

Reissued Sept. 23, 1958

24,539

VELVET CARPET FABRIC

Russell C. Gebert, Elkins Park, Pa., assignor to James Lees and Sons Company, Bridgeport, Pa., a corporation of Pennsylvania Original No. 2,708,457, dated May 17, 1955, Serial No. 363,461, June 23, 1953. Application for reissue October 24, 1955, Serial No. 542,535

3 Claims. (Cl. 139—403)

Matter enclosed in heavy brackets [ ] appears in the original patent but forms no part of this reissue specification; matter printed in italics indicates the additions made by reissue.

The present invention relates to an improved construction for velvet carpet fabrics.

In the production of the conventional velvet carpets it is customary to thread up the loom with the same number of pile yarns in each reed dent and to thread the yarns in each reed dent through heddle eyes carried on the same heddle frame. As a result of this conventional weaving, the carpet pile is of uniform density both weftwise and warpwise, and consequently, the usual carpet fabric exhibits weftwise and warpwise stripes, even when only one color of pile yarn is used.

With the foregoing in mind, a primary object of the present invention is to provide a valvet carpet fabric wherein the density of the pile varies so that the weftwise and warpwise rows of loops are not readily apparent.

A further object of the present invention is to provide a novel velvet carpet fabric which is economical of pile yarn and is woven on a conventional valvet loom.

More specifically, the invention contemplates a velvet type carpet fabric which exhibits improved texture and visual effect.

These and other objects of the invention and the various features and details of the construction thereof are more fully set forth hereinafter with reference to the accompanying drawings in which.

The present invention contemplates a velvet type carpet fabric having a solid ground fabric composed of upper and lower series of wefts, and spaced pairs of cooperating opposed binder warps. The pairs of binder warps and the upper series of wefts define a plurality of interstices through which the pile warp projects. In the present instance, the pile warps each pass into the fabric and around single wefts to form a plurality of base loops tying the projecting pile warp into the ground fabric. In accordance with the present invention, it has been found that by constructing the fabric so that the ratio of base loops to the ground fabric interstices is 3 to 2, a high-quality textured carpet is produced which is free from warpwise and weftwise stripes.

Referring more particularly to the drawings, each of the carpet fabrics is a 2-shot velve fabric. Whereas the pile surface of each embodiment is different, the ground fabrics are the same. The ground fabric of each carpet is conventional, comprising upper and lower series of wefts, 11 and 12 respectively, spaced pairs 13 of cooperating chain warps, and a plurality of stuffer warps 14. As seen in Figs. 3, 4, 7, 8, 11 and 12 the pairs 13 of the chain warps define a plurality of warpwise dents indicated at D1, D2, D3, etc., and the upper weft shots 11 intersecting the dents from a plurality of interstices 16.

Figure 1:
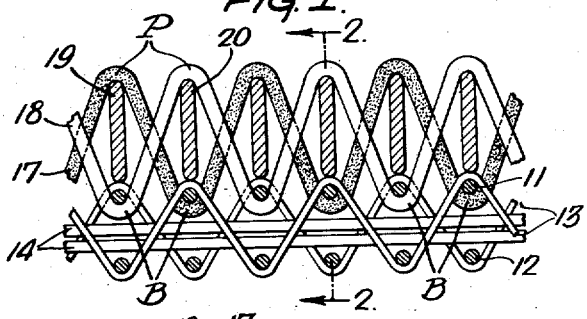
Fig. 1 is a warpwise section view of a carpet made in accordance with the present invention and embodying a weave complete on two wires and two dents, showing the position of the wires in the weaving operation.
Figure 2:
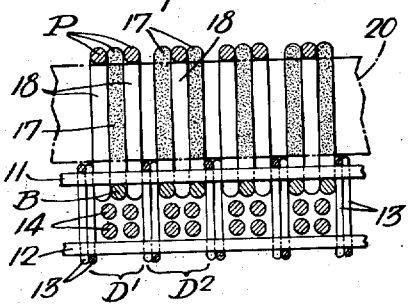
Fig. 2 is a weftwise section taken on the line 2—2 of Fig. 1 with the wires shown in broken lines.
Figure 3:
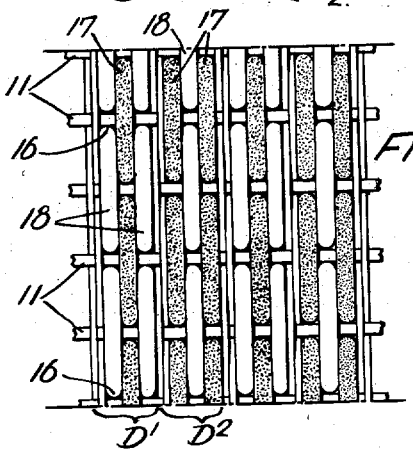
Fig. 3 is a plan view of the carpet illustrated in Figs. 1 and 2.

The pile surface of the carpet illustrated in Figs. 1 to 3 is formed by a plurality of pile warps 17 and 18. Each pile warp passes into the ground fabric through an interstice 16, around a weft shot, in the present instance the upper weft 11, and out of the ground fabric through the next adjacent interstice to thereby form a base loop B. Upon passing out of the ground fabric, the pile warp passes over one of the wires 19 and 20 and into the ground fabric again to form a projecting exposed pile loop P. The loops P constitute the pile surface of the carpet, and are securely tied under the wefts 11 by the base loops B.

In this embodiment of the invention, each pile loop P passes over a pile wire and its underlying wefts. The pile warps 17 pass over the wires 19 and are tied under the wefts 11 lying below the wires 20. The pile warps 18, on the other hand, pass over the wires 20 and are tied under the wefts 11 lying below the wires 19. In each dent there are three pile yarns. The dent D1 contains one of the pile warps 17 and two of the pile warps 18, and the dent D2 contains two of the pile warps 17 and one of the pile warps 18. The weave, therefore, is complete on two wires and two dents, or, stated differently, on four wefts and four chain warps.

In accordance with the invention, in each repeat of the weave the ratio of the base loops B to the interstices 16 is 3 to 2. By inspection of Fig. 3, it is observed that in each two wire-two dent repeat there are four of the interstices 16 and six of the base loops B, the number of base loops B being identical to the number of pile loops P. It is also observed that in the present instance on each weft 11, the ratio of the base loops to the dents is likewise 3 to 2, the dents D1 and D2 together containing three base loops B. Similarly, within each dent, the ratio of base loops B to wefts 11 is 3 to 2.

Because of the unequal distribution of base loops resulting from the 3 to 2 ratios, an improved texture and aesthetic effect is produced in the finished carpet. This new result is derived from the unequal densities of the pile at adjacent points along the wefts and along the dents within the ground fabric. This variation in density eliminates the stripe that is apparently on conventionally-woven carpet fabrics. The stripe being eliminated, the carpets of the present invention have a high quality texture and a novel and pleasing aesthetic effect which was heretofore unobtainable.

Figure 4:
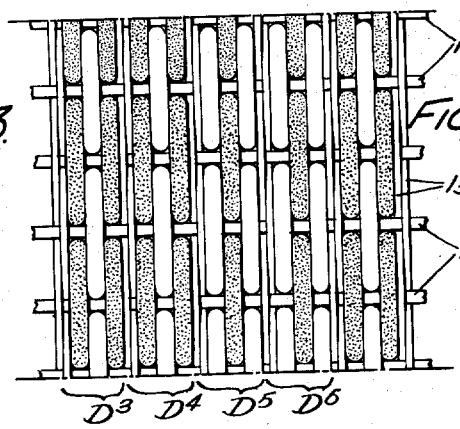
Fig. 4 is a plan view of a carpet similar to Fig. 3 but embodying a weave complete on two wires and four dents.

The carpet fabric illustrated in Fig. 4 obtains the novel result with a slight variation from the weave of Fig. 3. In this carpet, the weave is complete on two wires (not shown) and four dents D3, D4, D5, and D6 respectively. The dents D3 and D4 are threaded the same as in the dent D2 of the previously described embodiment, and the dents D5 and D6 are threaded as in the dent D1. In the complete weave, there are twelve base loops and eight interstices, so that the same 3 to 2 ratio is obtained. Likewise, on each weft there are six base loops for every four dents, and within each dent there are three base loops for every two upper wefts, so that the ratios here are also 3 to 2. Consequently, the carpet exhibits the same novel results obtained by the carpet of Fig. 3.

Figure 5:
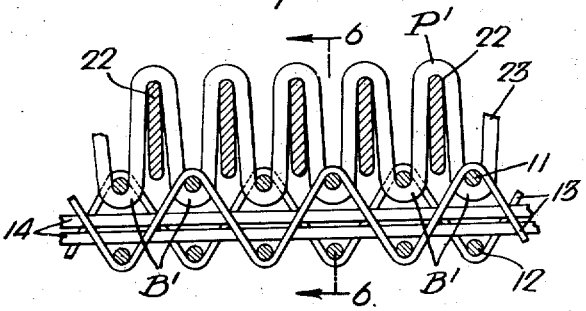
Fig. 5 is a warpwise sectional view similar to Fig. 1 of a carpet embodying a weave complete on one wire and two dents.
Figure 6:
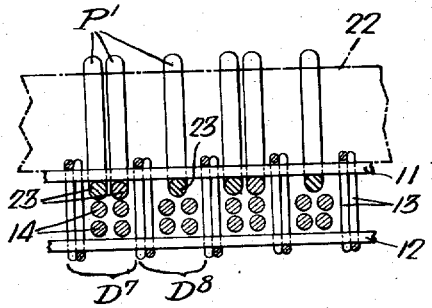
Fig. 6 is a sectional view similar to Fig. 2 taken on the line 6—6 of Fig. 5.
Figure 7:
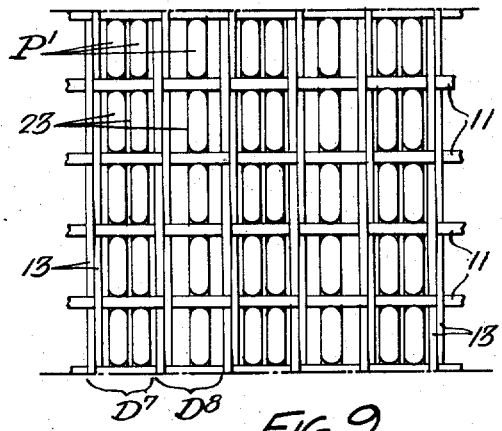
Fig. 7 is a plan view of the carpet illustrated in Figs. 5 and 6.

In the embodiment illustrated in Figs. 5 to 7, the weave is complete on one wire 22 and two dents D7 and D8. In this instance, a plurality of pile warps 23 are looped under the upper weft 11 of the ground fabric to form base loops B′, and over the wire 22 to form pile loops P′. With reference to Figs. 6 and 7, it is seen that the dents D7 contains two of the pile warps 23 and the dent D8 contains only one of the pile warps. All of the pile warps 23 are shedded over each wire 22 so that the weave is complete on one wire and two dents.

Fig. 7 clearly illustrates that there are three base loops B′ for each two interstices 16 of the ground fabric to thereby provide a 3 to 2 ratio between the base loops and the interstices. Likewise, along each upper weft for every two dents D7 and D8, there are also three base loops B′ so that the ratio here is also 3 to 2 so as to produce a variation in density of the pile weftwise of the fabric.

Figure 8:
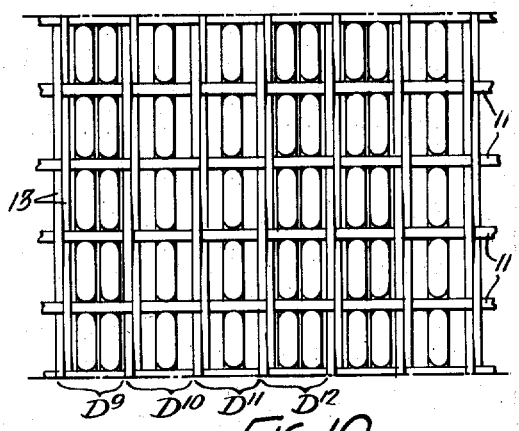
Fig. 8 is a plan view of a carpet similar to Fig. 7 but embodying a weave complete on one wire and four dents.

Fig. 8 illustrates a weave similar to Fig. 7 and complete on one wire (not shown) and four dents D9, D10, D11, and D12. In weaving this fabric, the dents D9, and D12 are threaded the same as in the dent D7, and the dents D10 and D11 are threaded as in the dent D8. From inspection of the figure, it is apparent that there are six base loops for the four interstices of the complete weave, and also for the four dents along the weft 11. The 3 to 2 ratios prevail and, therefore, provide different densities weftwise of the fabric to substantially eliminate weftwise stripes.

Figure 9:
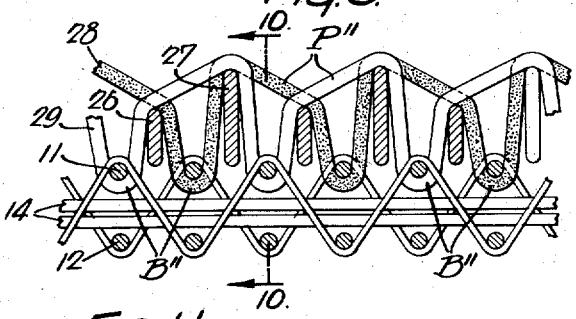
Fig. 9 is a warpwise sectional view similar to Fig. 1 of a carpet embodying a weave complete on two wires and two dents.
Figure 10:
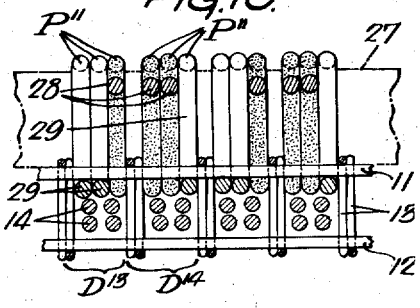
Fig. 10 is a sectional view similar to Fig. 2 taken on the line 10—10 of Fig. 9 with the wires shown in broken lines.
Figure 11:
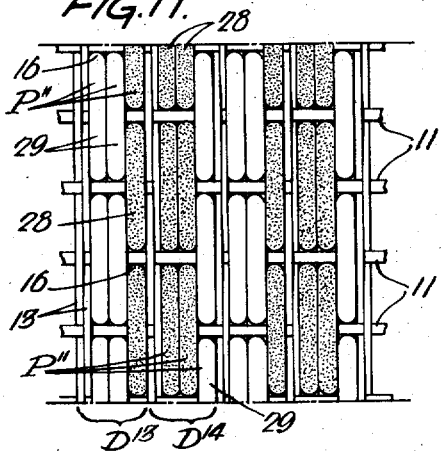
Fig. 11 is a plan view of the fabric illustrated in Figs. 9 and 10.

Figs. 9 to 11 illustrate a fabric modified in accordance with the teachings of the U. S. Patent, No. 2,571,860 dated October 16, 1951. As in the fabric of Fig. 3, the weave is complete on two wires 26 and 27 and two dents D13 and D14. The pile surface of the carpet is formed by pile warps 28 and 29 respectively. In this embodiment, as seen in Fig. 9, each of the warps 28 and 29 passes through an interstice 16 of the ground fabric under the upper weft 11 to form a base loop B″, out of the ground fabric to the next adjacent interstice 16, over the two pile wires 26 and 27 to form a pile loop P″, and back into the ground fabric through the next interstice 16.

As seen in Figs. 10 and 11, each of the dents D13 and D14 contains three of the pile warps 28 and 29. Dent D13 contains one of the pile warps 28 and two of the pile warps 29, whereas dent D14 contains two of the pile warps 28 and one of the pile warps 29. In Fig. 11, the weave, therefore, has four of the interstices 16 and six base loops B″. Thus, the ratio of loops to interstices is 3 to 2. Along each weft the ratio of base loops to dents, and along the dents the ratio of base loops to wefts 11 are both also 3 to 2. These ratios produce variations in pile density both warpwise and weftwise of the fabric and thus eliminate the undesirable effect produced by conventional carpet fabrics.

Figure 12:
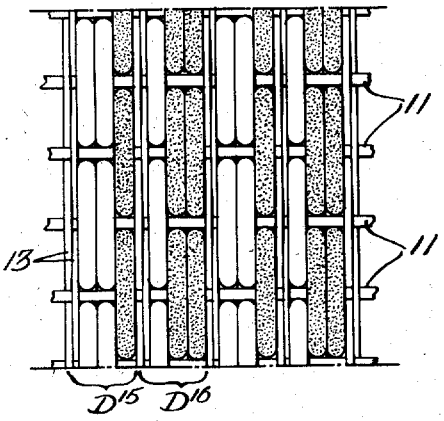
Fig. 12 is a plan view of a carpet similar to the carpet of Fig. 11 embodying a weave complete on two wires and two dents.

The carpet of Fig. 12 is similar to that of Fig. 11, being complete on two wires (not shown) and two dents D15 and D16, but here the dent D16 is threaded with yarns in the reverse order from the order in the dent D14 of Fig. 11, and dent D15 is threaded as in dent D13. The ratios set forth in connection with the fabric of Fig. 11 are the same as for the fabric of Fig. 12 and the carpet exhibits the novel texture and aesthetic effect set forth above in connection with Fig. 3.

Preferably, the warps in each fabric dent are threaded through a single reed dent, but it is not intended to limit the invention to fabrics woven on looms threaded in this [matter] *manner,* since it is possible to obtain the same novel results with minor variations in the threading-up of the loom. I have not attempted to exhibit all the various weaves contemplated by the present invention. For example, the pile warps may be tied under the lower wefts 12 (see my patent, No. 2,285,332 dated June 2, 1942); the pile loops P, P′, or P″ may be cut to form a tufted fabric; serrated or nub wires may be used; or any combination of these or any other velvet carpet constructions may be employed without departure from the present invention as defined in the appended claims.

I claim:

[1. A velvet pile carpet fabric having a ground fabric comprising a plurality of upper and lower weft shots, a plurality of cooperating pairs of chain warps interwoven with the weft shots to form a ground fabric having a plurality of interstices therein, and a pile surface composed of a plurality of pile warps, said pile warps each having pile-forming portions projecting out of the plane of said ground fabric and base loop portions passing under single weft shots, the number of said pile-forming warp portions projecting through each interstice of the ground fabric being variable in each weftwise course of said interstices.]

[2. A velvet pile carpet fabric having a ground fabric comprising a plurality of upper and lower weft shots, a plurality of cooperating pairs of chain warps interwoven with the weft shots to form a ground fabric having a plurality of interstices therein, and a pile surface composed of a plurality of pile warps, said pile warps each having pile-forming portions projecting out of the plane of said ground fabric and base loop portions passing under single weft shots, the number of said pile-forming warp portions projecting through each interstice of the ground fabric being variable in each warpwise course of said interstices.]

[3. A velve pile carpet fabric having a ground fabric comprising a plurality of upper and lower weft shots, a plurality of cooperating pairs of chain warps interwoven with the weft shots to form a ground fabric having a plurality of interstices therein, and a pile surface composed of a plurality of pile warps, said pile warps each having pile-forming portions projecting out of the plane of said ground fabric and base loop portions passing under single weft shots, the number of said pile-forming warp portions projecting through each interstice of the ground fabric being variable in each weftwise course and each warpwise course of said interstices.]

[4. A velvet pile carpet fabric having a ground fabric comprising a plurality of upper and lower weft shots, a plurality of cooperating pairs of chain warps interwoven with the weft shots to form a ground fabric having a plurality of interstices therein, and a pile surface composed of a plurality of pile warps, said pile warps each having pile-forming portions projecting out of the plane of said ground fabric and base loop portions passing under single weft shots, the ratio of said base loop portions of the pile warps to the interstices of the ground fabric in each complete weave repeat being 3 to 2.]

[5. A velvet pile carpet fabric having a ground fabric comprising upper and lower series of weft shots, a plurality of spaced pairs of cooperating chain warps interwoven with the weft shots to form the ground fabric, said pairs of chain warps defining a like number of warpwise fabric dents, and a pile surface composed of a plurality of pile warps, said pile warps each having pile-forming portions projecting out of the plane of said ground fabric and base loop portions passing under single weft shots in one of said upper and lower series, the ratio of base loop portions of the pile warps to the fabric dents along each weft shot in said one series being 3 to 2.]

[6. A velvet pile carpet fabric having a ground fabric comprising upper and lower series of weft shots, a plurality of spaced pairs of cooperating chain warps interwoven with the weft shots to form the ground fabric, said pairs of chain warps defining a like number of warpwise fabric dents, and a pile surface composed of a plurality of pile warps, said pile warps each having pile-forming portions projecting out of the plane of said ground fabric and base loop portions passing under single weft shots in one of said upper and lower series, the ratio of base loop portions of the pile warps in each dent to the weft shots in said one series is 3 to 2.]

[7. A velvet pile carpet fabric having a ground fabric comprising upper and lower series of weft shots, a plurality of spaced pairs of cooperating chain warps interwoven with the weft shots to form the ground fabric, said pairs of chain warps defining a like number of warpwise fabric dents, and a pile surface composed of a plurality of pile warps, said warps each having pile-forming portions projecting out of the plane of said ground fabric and base loop portions passing under single weft shots in one of said upper and lower series, the ratio of base loop portions of the pile warps to fabric dents along each weft shot in said one series being 3 to 2, and the ratio of the base loop portions of the pile warps in each dent to the weft shots in said one series is also 3 to 2.]

[8. A fabric construction according to claim 7 wherein each warpwise fabric dent contains three pile warps, two of said warps in the first dent having base loops passing under only alternate weft shots in said one series, and the third of said warps passing under only the intermediate weft shots in said one series, two of said warps in a second dent having base loops passing under only the said intermediate weft shots, and the third of said warps in the second dent passing under only the said alternate weft shots.]

[9. A fabric according to claim 8 wherein the pile-forming portions of the pile warps are in the form of pile loops.]

*10. A velvet pile fabric having a series of weft shots, a plurality of spaced chain warps interwoven with the weft shots to form a ground, said spaced chain warps defining a like number of warpwise dents, a pile surface composed of a plurality of pile warps in each dent said pile warps each having pile forming portions projecting from said ground, and base loop portions passing under each weft shot, at least one of said base loop portions in each dent passing under each weft shot and every base loop portion passing alternately weftwise under adjacent shots, the number of said base loop portions in each dent passing under each weft shot varying weftwise along each shot and warpwise in each dent at each weft.*

*11. A velvet pile fabric having a series of weft shots, a plurality of spaced chain warps interwoven with the weft shots to form a ground, said spaced chain warps defining a like number of warpwise dents, a pile surface composed of a plurality of pile warps in each dent said warps each having pile forming portions projecting from said ground, and base loop portions passing under each weft shot, at least one of said base loop portions in each dent passing under each weft shot and every base loop portion passing alternately weftwise under adjacent shots, the ratio of base loop portions of the pile warps to fabric dents along each weft shot being 3–2.*

*12. A velvet pile fabric having a series of weft shots, a plurality of spaced chain warps interwoven with the weft shots to form a ground, said spaced chain warps defining a like number of warpwise dents, a pile surface composed of a plurality of pile warps in each dent said pile warps each having pile forming portions projecting from said ground, and base loop portions passing under each weft shot, at least one of said base loop portions in each dent passing under each weft shot and every base loop portion passing alternately weftwise under adjacent shots, the ratio of base loop portions of the pile warps to fabric dents along each weft shot being 3–2, and the ratio of the base loop portions of the pile warps in each dent to consecutive shots being also 3–2.*

References Cited in the file of this patent or the original patent

UNITED STATES PATENTS

| | | |
|---|---|---|
| 2,285,332 | Gebert | June 2, 1942 |
| 2,647,546 | Ryan | Aug. 4, 1953 |
| 2,714,902 | Hoselbarth | Aug. 9, 1955 |
| 2,754,856 | Hoselbarth | July 17, 1956 |

FOREIGN PATENTS

| | | |
|---|---|---|
| 814,846 | France | Mar. 30, 1937 |